(12) United States Patent
Ruch et al.

(10) Patent No.: US 11,092,189 B2
(45) Date of Patent: Aug. 17, 2021

(54) HEAD SHAFT ASSEMBLY AND RELATED METHOD

(71) Applicant: Brentwood Industries, Inc., Reading, PA (US)

(72) Inventors: Jason C. Ruch, Elverson, PA (US); Daniel Eckman, Morgantown, PA (US); Christopher Stephan Fredericks, Pottstown, PA (US); Alexander Ivanovich Mitchell, Wyomissing, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 0 days.

(21) Appl. No.: 16/605,280

(22) PCT Filed: May 8, 2018

(86) PCT No.: PCT/US2018/031514
§ 371 (c)(1),
(2) Date: Oct. 15, 2019

(87) PCT Pub. No.: WO2019/216882
PCT Pub. Date: Nov. 14, 2019

(65) Prior Publication Data
US 2021/0054871 A1 Feb. 25, 2021

(51) Int. Cl.
*B01D 21/20* (2006.01)
*F16C 3/02* (2006.01)
(Continued)

(52) U.S. Cl.
CPC .............. *F16C 3/023* (2013.01); *B01D 21/20* (2013.01); *B01D 21/245* (2013.01);
(Continued)

(58) Field of Classification Search
CPC ........ F16C 3/023; F16C 33/201; F16C 17/02; F16C 2208/78; F16C 2226/62;
(Continued)

(56) References Cited

U.S. PATENT DOCUMENTS 2,028,094 A * 1/1936 Shafer, Jr. .............. B01D 21/18
210/526
2,956,206 A 10/1960 Shafer, Jr.
(Continued)

FOREIGN PATENT DOCUMENTS

JP 20000126512 A 5/2000

*Primary Examiner* — Greg Binda
(74) *Attorney, Agent, or Firm* — Panitch Schwarze Belisario & Nadel LLP

(57) ABSTRACT

A head shaft assembly has a center tube, an end tube, a collector sprocket and a collar. The center tube has drive and driven ends. The center tube has a center tube diameter. The end tube has a key extending longitudinally along an outer surface and inner and outer ends. The key defines a key length and the end tube has an end tube diameter. The collector sprocket is mountable to the end tube and rotationally secured to the end tube by the key. The collar is hollow between a first end and a second end. The center tube diameter is substantially the same as the end tube diameter and the drive end is proximate to the inner end. The drive end and the inner end are positioned within the collar between the first end and the second end. The collar fixes the center tube to the end tube.

21 Claims, 5 Drawing Sheets

(51) Int. Cl.
*B01D 21/24* (2006.01)
*F16C 17/02* (2006.01)
*F16C 33/20* (2006.01)
*F16D 1/08* (2006.01)
*F16H 7/06* (2006.01)

(52) U.S. Cl.
CPC .......... *B01D 21/2433* (2013.01); *F16C 17/02* (2013.01); *F16C 33/201* (2013.01); *F16D 1/0876* (2013.01); *F16H 7/06* (2013.01); *F16C 2208/00* (2013.01); *F16C 2208/78* (2013.01); *F16C 2226/62* (2013.01); *F16C 2320/00* (2013.01); *F16D 2250/0069* (2013.01); *Y10T 403/32508* (2015.01)

(58) Field of Classification Search
CPC .. F16C 2208/00; F16C 2320/00; B01D 21/20; B01D 21/2433; B01D 21/245; F16H 7/06; F16D 1/0876; F16D 2250/0069; Y10T 403/32508
USPC .......................................................... 210/526
See application file for complete search history.

(56) References Cited

U.S. PATENT DOCUMENTS

| | | |
|---|---|---|
| 3,831,767 A | 8/1974 | Lefur et al. |
| 4,645,598 A | 2/1987 | Hannum |
| 5,035,681 A | 7/1991 | Hertel et al. |
| 6,279,752 B1 | 8/2001 | Hannum |
| 8,887,901 B2 * | 11/2014 | Cox ....................... B65G 23/06 |
| 2015/0209694 A1 | 7/2015 | Selle |

* cited by examiner

HEAD SHAFT ASSEMBLY AND RELATED METHOD

CROSS-REFERENCE TO RELATED APPLICATION

This application is a Section 371 of International Application No. PCT/US2018/031514 filed May 8, 2018, the entirety of which is incorporated herein by reference.

BACKGROUND OF THE INVENTION

Head shaft assemblies for wastewater chain-and-flight sludge collection systems are dominated by telescopic and one-piece head shaft designs that span a tank width $W_T$ of a tank 2. These one-piece and telescopic head shafts must be predesigned and customized to accommodate a specific sprocket position and the tank width $W_T$ before shipping the customized one-piece or telescopic head shaft to the field location. The customized telescopic and one-piece shafts do not function if tank measurements are incorrect or the design changes after the shaft is manufactured.

Prior art drive keys in the wastewater industry that transfer torque and rotation from the head shaft to the gears also have numerous limitations. Stainless steel prior art keys have a relatively high material cost. Nylon keys absorb water and expand, which is undesirable. Typically, a slot is pre-designed and machined into the head shaft to fit a removable key, raising machining cost and requiring customization.

It would be desirable to design, construct and deploy a head shaft assembly for a wastewater tank that utilizes standard parts for multiple sized tanks. It is also desirable to design, develop and deploy a head shaft assembly that does not require the stainless steel and nylon keys. The preferred present invention addresses the shortcomings of the prior art systems.

BRIEF SUMMARY OF THE INVENTION

The preferred invention is a new type of head shaft assembly found in a chain-and-flight sludge collection system, used to collect settled solids from the bottom of a clarifier moving them toward a pit or sump to be removed by pumps and/or to move scum from the water surface of the clarifier to a scum removal trough in the water and wastewater treatment industries. The head shaft serves two purposes, to preserve the alignment of the chain drives on either side of the tank, and to transmit torque from the drive side to the driven side of the head shaft.

Briefly stated, the preferred invention is directed to a head shaft assembly having a center tube, an end tube, a collector sprocket and a collar. The center tube has a drive end and a driven end. The center tube has a center tube diameter. The end tube has a key extending longitudinally along an outer surface, an inner end and an outer end. The key defines a key length and the end tube has an end tube diameter. The collector sprocket is mountable to the end tube and is rotationally secured to the end tube by the key. The collar is hollow between a first end and a second end. The center tube diameter is substantially the same as the end tube diameter and the drive end is preferably proximate to the inner end. The drive end may alternatively abut the inner end in the assembled configuration or may be spaced with both positioned within the hollow of the collar between the first and second ends. The drive end and the inner end are positioned within the collar between the first end and the second end. The collar fixes the center tube to the end tube.

In another aspect, the preferred invention is directed to a head shaft assembly for mounting in a clarifier or municipal, aquaculture, industrial water or wastewater tank having a tank width. The head shaft assembly includes a center tube, a drive side end tube, a driven side end tube, a drive side collector sprocket, a driven side collector sprocket, a drive side collar and a driven side collar. The center tube has a drive end, a driven end and a center tube diameter. The drive side end tube has a drive side key extending longitudinally along an outer surface, an inner drive side end and an outer drive side end. The drive side end tube has a drive side end tube diameter. The driven side end tube has a driven side key extending longitudinally along an outer surface, an inner driven side end and an outer driven side end. The driven side end tube has a driven side end tube diameter. The drive side collector sprocket is mountable to the drive side end tube and is rotationally secured to the drive side end tube in an assembled configuration. The driven side collector sprocket is mountable to the driven side end tube and is rotationally secured to the driven side end tube in the assembled configuration. The drive side collar is hollow between a first drive end and a second drive end. The driven side collar is hollow between a first driven end and a second driven end. The center tube diameter is substantially the same as the drive side end tube diameter and the driven side end tube diameter. The drive end is positioned proximate to the inner drive side end and the driven end is positioned proximate the inner driven side end in the assembled configuration. The drive end and the inner end are positioned within the collar between the first end and the second end in the assembled configuration. The collar fixes the center tube to the end tube in the assembled configuration

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
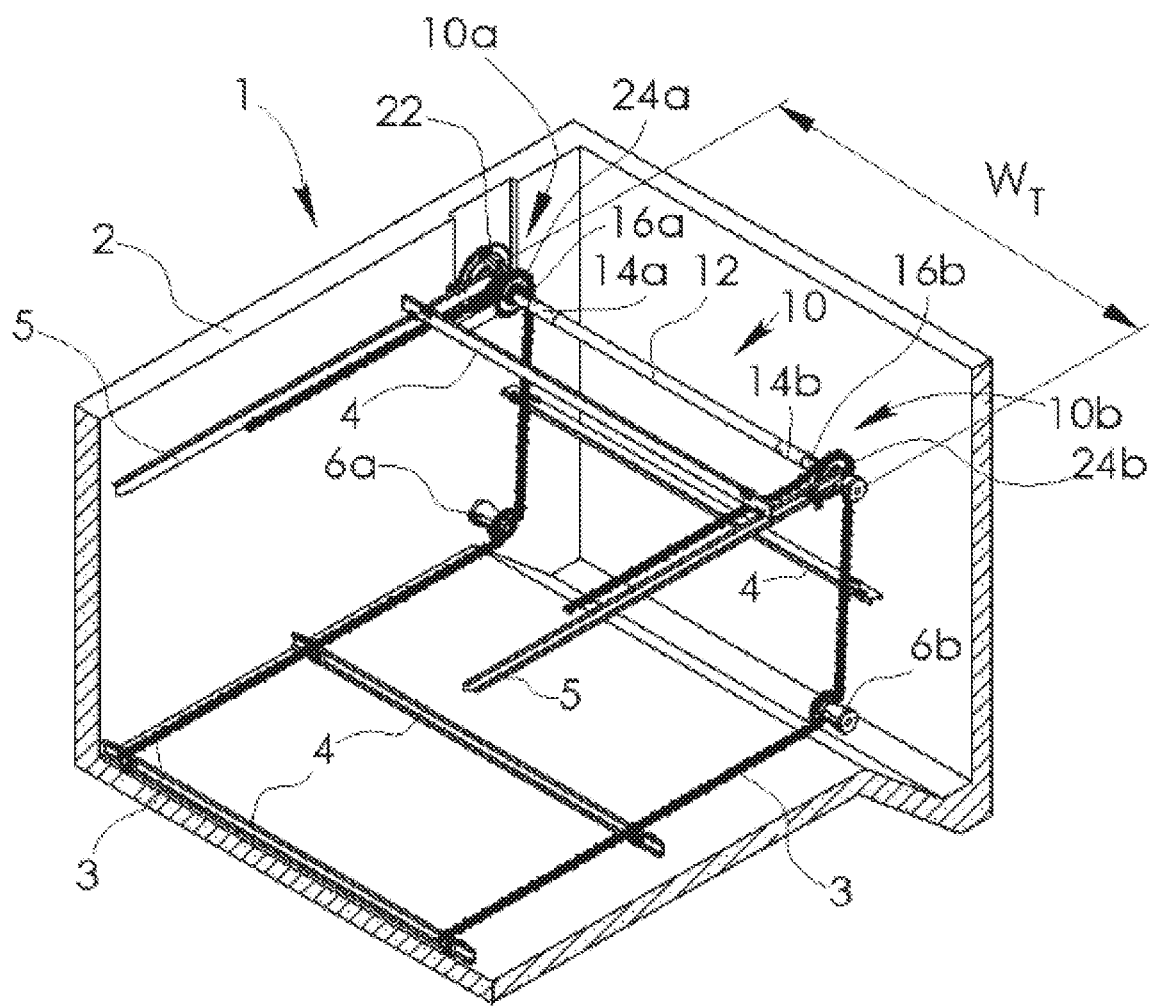
FIG. 1 is a top perspective, partial cut-away view of a chain-and-flight sludge collection system mounted in a clarifier or municipal, aquaculture or industrial water or wastewater treatment tank and, specifically a head shaft assembly in accordance with a first preferred embodiment of the present invention mounted in a tank of the system.
Figure 2:
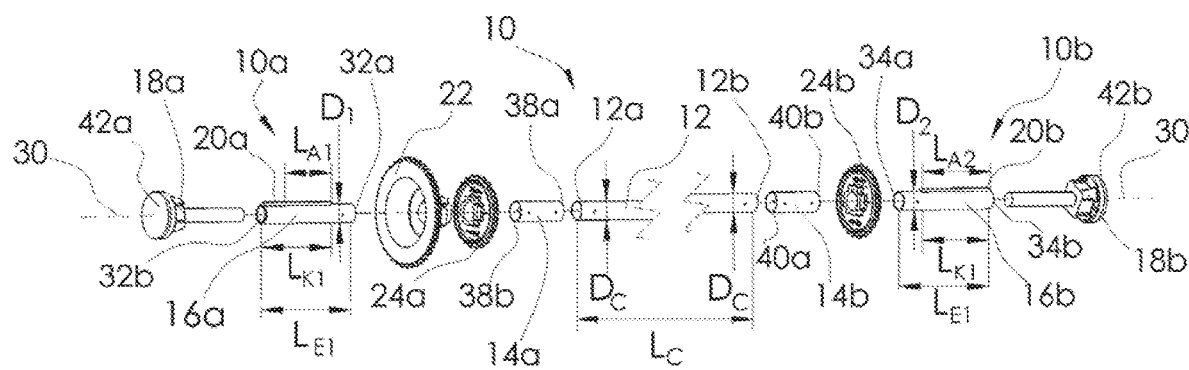
FIG. 2 is a front perspective, partially exploded view of the head shaft assembly of FIG. 1.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of a preferred head shaft assembly and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-4, a first preferred embodiment of the invention is directed to a head shaft assembly, generally designated 10, for use with a chain-and-flight sludge collection system, generally designated 1, used to collect settled solids from the bottom of a clarifier moving them toward a pit or sump to be removed by pumps and/or to move scum from the water surface of the clarifier to a scum removal trough in the water and wastewater treatment industries. The chain-and-flight sludge collection system 1 is mounted in a water, sludge, clarifier and/or wastewater treatment tank 2 to scrape the bottom of the tank and skim the surface of the water and wastewater in the tank 2. The wastewater tank 2 may be comprised of a municipal, aquaculture or industrial water or wastewater tank 2. The preferred head shaft assembly 10 is configured for mounting in the wastewater tank 2. The chain-and-flight sludge collection system 1 includes, among other components, the tank 2, two opposing chains 3, a plurality of flights 4 that are each mounted at their ends to the chains 3, return track assemblies 5 that support the plurality of flights 4 and chains 3 as the plurality of flights 4 skim the water, idler stub shaft assemblies 6 that support and guide the movement of the chains 3 and various monitoring components (not shown) that track the movement of the plurality of flights 4 and chains 3. The head shaft assembly 10 spans a tank width $W_T$ of the tank 2 that is variable to typical tanks 2 based on location, purpose, and other related preferences and constraints. The tank width $W_T$ can vary greatly, but is typically between three and thirty feet (3-30') for most water and wastewater treatment tanks 2. The preferred head shaft assembly 10, which spans the tank width $W_T$ is, therefore, adaptable for installation into the variously sized tanks 2. The head shaft assembly 10 is not limited to spanning the entire tank width $W_T$ as, for example, very large tanks 2 may be split into bays with multiple systems mounted within the tanks 2, one within each bay to operate within the tank 2.

The head shaft assembly 10 of the first preferred embodiment serves two main purposes in the chain-and-flight sludge collection system 1, including: (1) to preserve the alignment of the chains 3 on either side of the tank 2 and (2) to transmit torque from a drive side 10a of the head shaft assembly 10 to a driven side 10b of the head shaft assembly 10. During installation and replacement, the preferred head shaft assembly 10 is preferably adaptable to the various tank widths $W_T$ at the site of installation. Prior art shaft were custom made for each tank 2, thereby causing delays in manufacturing the head shaft assemblies and significant expense, particularly if a delivered head shaft assembly did not fit into the tank 2, such as because measurements of the tank width $W_T$ were incorrect or dimensions changed following initial design.

The first preferred head shaft assembly 10 has three (3) tubes, including a center tube 12, as well as an end tube 16, including a drive side end tube 16a and a driven side end tube 16b. The preferred end tubes 16, including the drive and driven side end tubes 16a, 16b, as well as the center tube 12 are hollow, but are not so limited and may be solid, partially hollow and partially solid or otherwise configured. The center tube 12 has a center tube diameter $D_C$, the drive side end tube 16a has a drive side end tube diameter $D_1$ and the driven side end tube 16b has a driven side end tube diameter $D_2$. In the first preferred embodiment, the center tube diameter $D_C$, the drive side end tube diameter $D_1$ and the driven side end tube diameter $D_2$ are substantially the same, but are not so limited and may be slightly different, although the diameters $D_C$, $D_1$, $D_2$ are preferably substantially the same at the ends of the center tube 12, the drive side end tube 16a and the driven side end tube 16b. In addition, the center tube 12, the drive side end tube 16a and the driven side end tube 16b are not limited to being hollow and may be solid. Further, the center tube 12, the drive side end tube 16a and the driven side end tube 16b may have slightly different diameters $D_C$, $D_1$, $D_2$, depending on the design and configuration of the head shaft assembly 10.

The drive and driven side end tubes 16a, 16b and the center tube 12 are preferably joined by a collar 14. In the first preferred embodiment, the collar 14 is comprised of two (2) collars 14, including a drive side collar 14a and a driven side collar 14b. The collars 14a, 14b are preferably hollow between a first inner end 38a, 40a and a second outer end 38b, 40b. The center tube 12 includes a drive end 12a and a driven end 12b. The drive side collar 14a and the driven side collar 14b slide over the drive and driven ends 12a, 12b of the center tube 12 and the joining ends of the drive and driven side collars 14a, 14b and are bolted to the drive and driven ends 12a, 12b and the inner joining ends of the drive and driven side collars 14a, 14b, respectively. Specifically, the drive side collar 14a is preferably positioned over the drive end 12a of the center tube 12 and the adjoining end of the drive side end tube 16a and the driven side collar 14b is positioned over the driven end 12b of the center tube 12 and the adjoining end of the driven side end tube 16b in an assembled configuration. The drive and driven side collars 14a, 14b are then preferably fixed or secured to the center tube 12, the drive side end tube 16a and the driven side end tube 16b, preferably by bolting or otherwise fastening the tubes 12, 16a, 16b to the collars 14a, 14b.

In the first preferred embodiment, the center tube diameter $D_C$ is substantially the same as the end tube diameter $D_1$, $D_2$. The drive end 12a of the center tube 12 is preferably proximate to the inner end 32a of the drive side end tube 16a in the assembled configuration and the drive end 12b and the inner end 34a of the driven side end tube 16b are preferably proximate to each other in the assembled configuration. The drive end 12a of the center tube 12 and the inner end 32a of the drive side end tube 16a are positioned within the drive side collar 14a between the first inner end 38a and the second outer end 38b in the assembled configuration. Similarly, the driven end 12b of the center tube 12 and the inner end 34a of the driven side end tube 16b are positioned within the driven side collar 14b between the first inner end 40a and the second outer end 40b in the assembled configuration. The drive side and driven side collars 14a, 14b rotatably fix the center tube 12 to the drive side and driven side end tubes 16a, 16b, respectively, in the assembled configuration. The drive end 12a and driven end 12b of the center tube 12 may alternatively be configured in a spaced relationship to the inner end 32a of the drive side end tube 16a and the inner end 34a of the driven side end tube 16b, respectively, with the drive and driven side collars 14a, 14b fixing the center tube 12 to the drive and driven side end tubes 16a, 16b in the assembled configuration.

The head shaft assembly 10 of the first preferred embodiment also has spindles 18, including a drive side spindle 18a and a driven side spindle 18b, that are integrally formed with drive and driven side mounting grouts 42a, 42b, respectively, and are fixed to the tank 2 by anchors. The spindles 18 are secured to the drive and driven side end tubes 16a, 16b, respectively, by bearings, such that the drive and driven side end tubes 16a, 16b rotate relative to the substantially stationary drive and driven side spindles 18a, 18b. The spindles 18 are mounted to the walls of the tank 2 to stabilize the head shaft assembly 10 and to set the position of the head shaft including the center tube 12 and the drive and driven side end tubes 16a, 16b.

Rectangular keys or integral keys 20a, 20b are preferably integrated on the drive and driven side end tubes 16a, 16b to transfer torque between a bull sprocket 22 and drive and driven side collector sprockets 24a, 24b. The torque is preferably transferred, in the first preferred embodiment, from the bull sprocket 22 to the drive side integral key 20a and drive side end tube 16a, to the drive side collector sprocket 24a and the drive side collar 14a, to the center tube 12, to the driven side collar 14b, to the driven side end tube 16b and to the driven side collector sprocket 24b. In the first preferred embodiment, the drive and driven side end tubes 16a, 16b have the same or substantially the same construction and, therefore, may be constructed as the same part, with the drive and driven side integral keys 20a, 20b positioned outwardly relative to the center tube 12 in the assembled configuration. The drive and driven side integral keys 20a, 20b, in combination with the three-tube structure, including the center tube 12 and the end tubes 16a, 16b, and collars 14a, 14b, comprise a kit or assembly that can be shipped as a kit and field-adjusted for installation into the tank 2. The keys 20a, 20b may be integrally formed with the drive and driven side end tubes 16a, 16b. Alternatively, the integral keys 20a, 20b may be formed separately from the drive and driven side end tubes 16a, 16b and may be fastened to the drive and driven side end tubes 16a, 16b by a plurality of key fasteners or key hardware 36, adhesives 21, adhesive bonding, clamping, a combination of fastening devices or methods or other devices or methods that secure the integral keys 20a, 20b to the drive and driven side end tubes 16a, 16b. The drive and driven side collector sprockets 24a, 24b are mountable to the drive and driven side end tubes 16a, 16b, respectively, and are rotationally secured to the end tubes 16a, 16b by the keys 20a, 20b in the assembled configuration.

Figure 3:
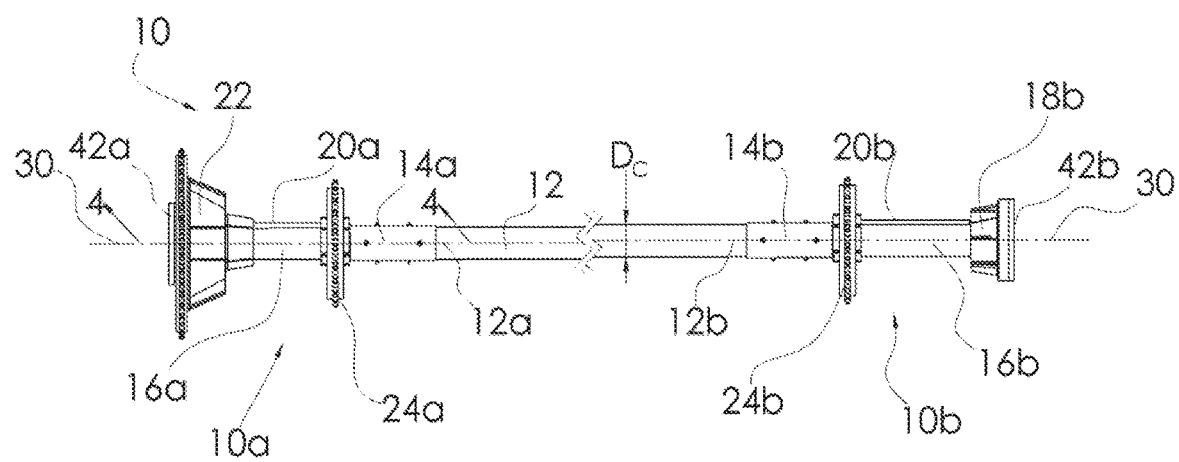
FIG. 3 is a front elevational view of the head shaft assembly of FIG. 1.
Figure 4:
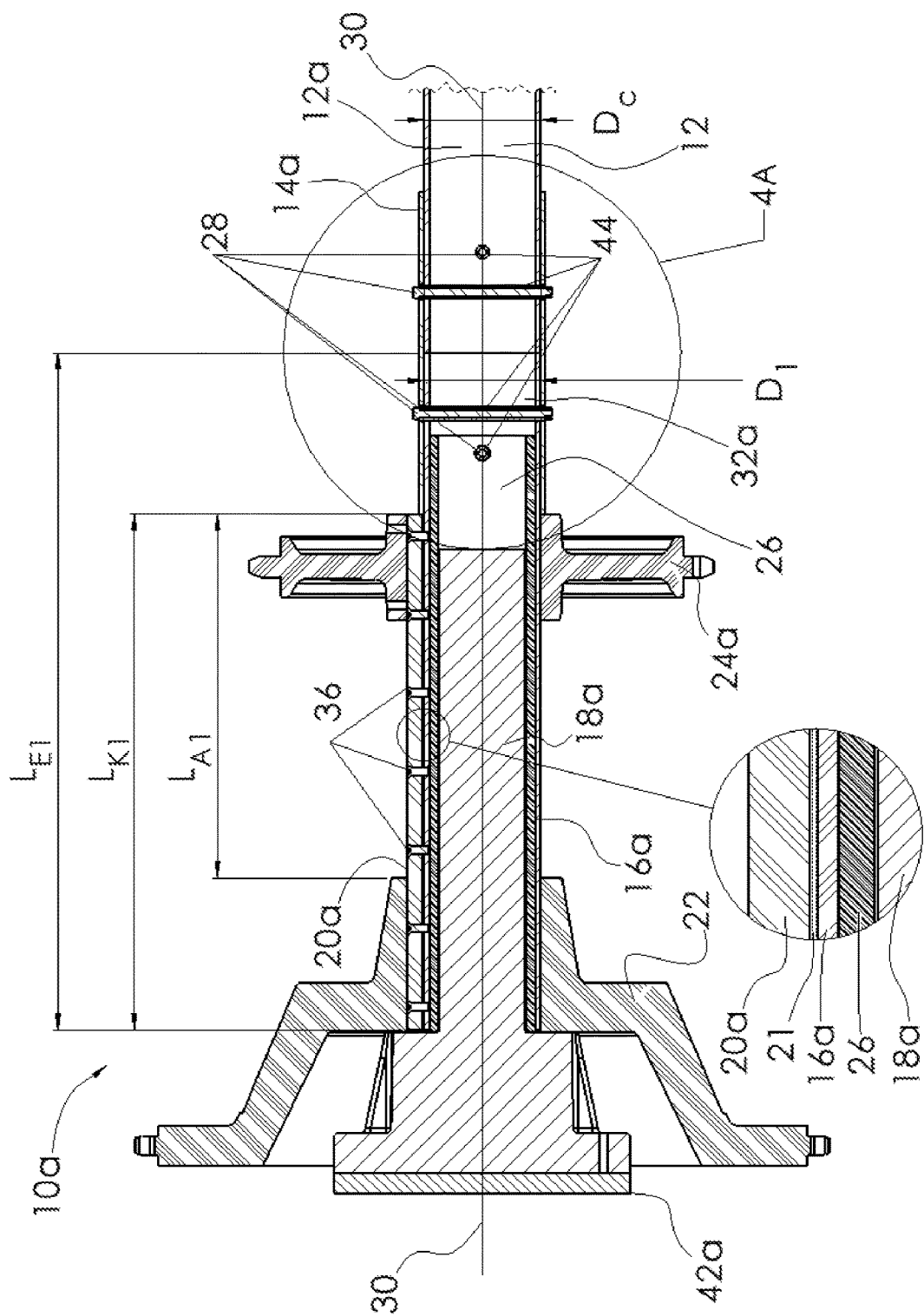
FIG. 4 is a cross-sectional view of a portion of the head shaft assembly of FIG. 1, taken along line 4-4 of FIG. 3 and a magnified view of a portion of the cross-sectional view taken from within the circle.
Figure 4A:
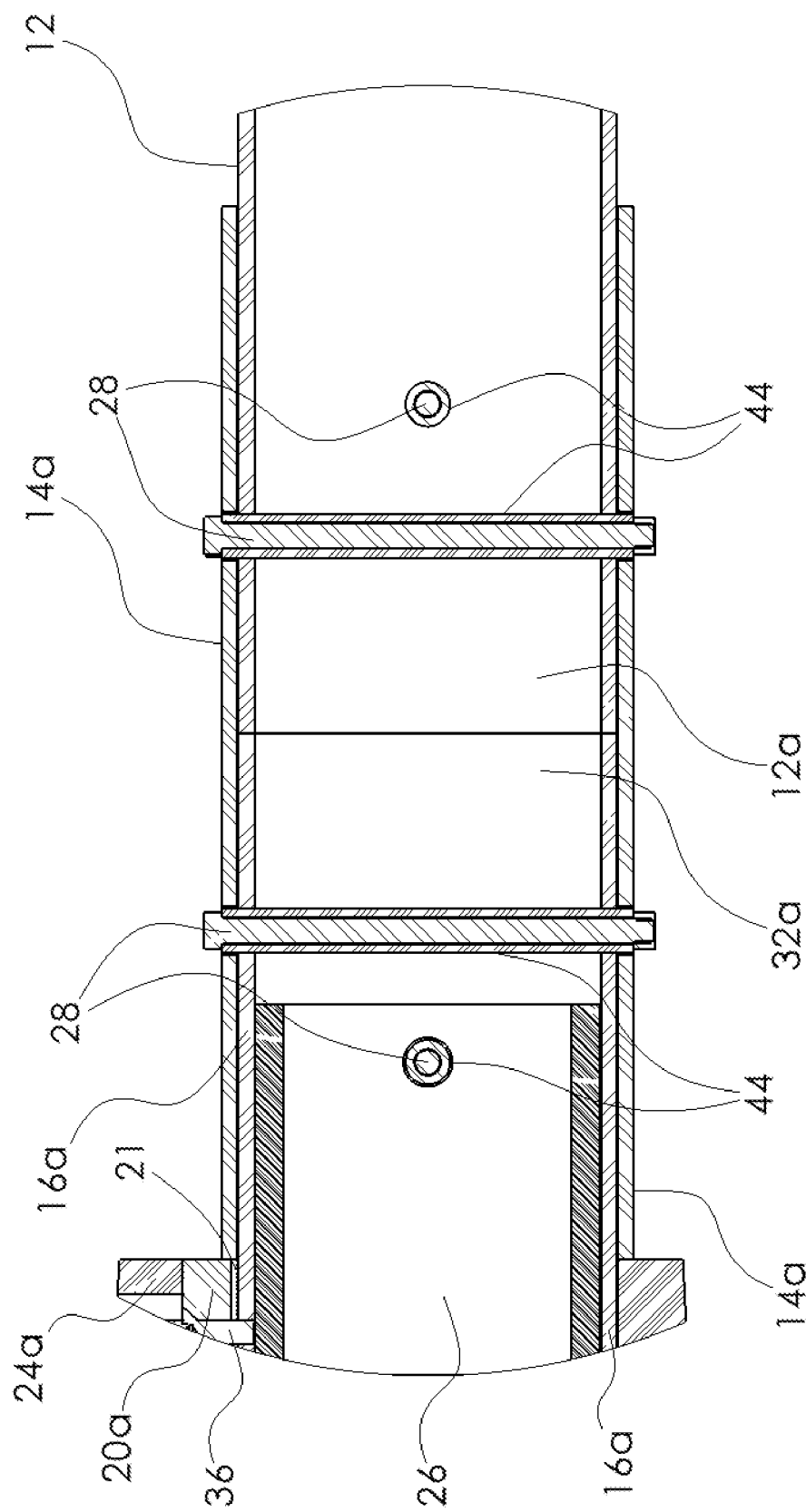
FIG. 4A is a magnified cross-sectional view of a portion of the head shaft assembly of FIG. 4, taken from within circle 4A of FIG. 4.

The kit or head shaft assembly 10 is unique in an industry dominated by telescopic and one-piece head shaft designs. Prior art one-piece and telescopic head shafts must be predesigned and customized to accommodate a specific sprocket position and the tank width $W_T$ or bay width before shipping the customized one-piece or telescopic head shaft to the field location. In contrast, the head shaft assembly 10 is preferably shipped as an adjustable kit, with no prior customization needed. The center tube 12 may be manufactured in various lengths based on typical tank widths $W_T$, delivered to the tank 2, cut to size based on the tank width WT and assembled with the remainder of the components of the head shaft assembly 10 such that detailed field measurements of the tank 2 and system are not required. The drive and driven side collector sprockets 24a, 24b are located to their proper position along the end tubes 16a, 16b, and the length of the assembly is dictated by cutting the center tube 12 to an appropriate length to fit the specific tank width $W_T$. The center tube 12 preferably has a center tube length $L_C$ measured between the drive end 12a and the driven end 12b. The center tube length $L_C$ is configured to be adjusted by cutting the center tube 12 to adapt the head shaft assembly 10 for the specific tank width $W_T$. The user is preferably able to cut the center tube 12 at either or both the drive and driven side ends 12a, 12b to adapt the assembly 10 to the tank 2. The preferred drive and driven side end tubes 16a, 16b include inner ends 32a, 34a positioned proximate or abutting the center tube 12 in the assembled configuration and outer end 32b, 34b opposite the inner ends 32a, 34a. In the first preferred embodiment, the inner ends 32a, 34a are abutting or proximate, such as positioned approximately six inches (6") or less from the outer ends or drive and driven side ends 12a, 12b of the center tube 12 in the assembled configuration (FIGS. 3 and 4). Alternatively, the head shaft assembly 10 may be constructed with the drive or driven side end tubes 16a, 16b lengthened, the center tube 12 eliminated and a single collar 14 connecting the drive and driven side end tubes 16a, 16b together, such that one of the drive or driven side end tubes 16a, 16b effectively becomes the center tube 12, as is described below with the second preferred embodiment In the first preferred embodiment, the head shaft assembly 10, including the center tube 12, the drive side end tube 16a and the driven side end tube 16b, has a longitudinal axis 30 that extends substantially longitudinally through the tubes 12, 16a, 16b. The keys 20a, 20b, including the drive side key 20a and the driven side key 20b, preferably extend longitudinally or parallel to the longitudinal axis 30 along an outer surface of the end tubes 16a, 16b. The drive side key 20a has a drive side key length $L_{K1}$ and the driven side key 20b has a driven side key length $L_{K2}$. The drive side end tube 16a has a drive side end tube length $L_{E1}$ and the driven side end tube 16b has a driven side end tube length $L_{E2}$. The drive side end tube length $L_{E1}$ is greater than the drive side key length $L_{K1}$ and the driven side end tube length $L_{E2}$ is greater than the driven side key length $L_{K2}$. The drive and driven side keys 20a, 20b preferably extend from the outer ends 32b, 34b toward the inner ends 32a, 34a, respectively, but do not extend completely to the inner ends 32a, 34a. In the first preferred embodiment, as was described above, the drive and driven side end tubes 16a, 16b are the same or substantially the same part, therefore, the drive and driven side key lengths $L_{K1}$, $L_{K2}$ are the same or substantially the same and the drive and driven side end tube lengths $L_{E1}$, $L_{E2}$ are the same or substantially the same. The space on the drive and driven side end tubes 16a, 16b without the keys 20a, 20b preferably accommodate mounting of the drive and driven side collars 14a, 14b or overlap of the drive and driven side collars 14a, 14b onto the space on the drive and driven side end tubes 16a, 16b, respectively.

The drive and driven side keys 20a, 20b also preferably have drive and driven side available lengths $L_{A1}$, $L_{A2}$ along which the drive and driven side collector sprockets 24a, 24b may be mounted. The drive side available length $L_{A1}$ is comprised of a distance between an inner end of the drive side key 20a and the portion of the drive side key 20a exposed from an inner end of the bull sprocket 22 when the bull sprocket 22 is mounted to the drive side end tube 16a, as the outer portion of the drive side key 20a is engaged and covered by the bull sprocket 22. The driven side available length $L_{A2}$ is comprised of substantially the entire driven side key length $L_{K2}$, as the entire driven side key length $L_{K2}$ is exposed in the assembled configuration between its inner end and the outer end 34b that is positioned proximate an inner face of the driven side mounting grout 42b. The drive and driven side available lengths $L_{A1}$, $L_{A2}$ facilitate adjustability of the positioning of the drive and driven side collector sprockets 24a, 24b such that the assembly 10 is able to accommodate variations in the positioning of the collector sprockets 24a, 24b and their associated chains that may be unique in various tanks 2 and bays. The drive and driven side collector sprockets 24a, 24b may be mounted anywhere along the available lengths LA1, LA2 to drive rotation of the chains and operation of the systems. The inner portions of the drive and driven side end tubes 16a, 16b that do not include the drive and driven side keys 20a, 20b thereon are preferably cylindrically-shaped and accommodate mounting of the drive and driven side collars 14a, 14b. In the first preferred embodiment, outer ends of the drive and driven side collars 14a, 14b abut inner ends of the drive and driven side keys 20a, 20b in the assembled configuration to facilitate positioning of the collars 14a, 14b and mounting of the collars 14a, 14b to the end tubes 20a, 20b and the center tube 12.

The keys 20a, 20b are not limited to the specific configuration shown and described herein, but are preferably designed to extend from the drive and driven side end tubes 16a, 16b and transmit torque or rotation from the bull sprocket 22 to the drive side collector sprocket 24a and from the driven side end tube 16b to the driven side collector sprocket 24b. The bull sprocket 22 is mounted to the drive side end tube 16a and is rotatably secured to the drive side end tube 16a by the drive side integral key 20a in the assembled configuration. The shorter drive and driven side keys 20a, 20b, when compared to the drive and driven side end tube lengths $L_{E1}$, $L_{E2}$ provide a section of the drive and driven side end tubes 16a, 16b over which the collars 14a, 14b may slide onto or engage. The inner ends of the drive and driven side keys 20a, 20b may be positioned such that an outer end of the drive and driven side collars 14a, 14b abut the keys 20a, 20b in the assembled configuration for proper positioning of the drive and driven side collars 14a, 14b and drive and driven side collector sprockets 24a, 24b on the assembled head shaft assembly 10.

A field-adjustable center tube 12 that facilitates a field adjustable head shaft assembly 10 that is mountable in nearly any sized tank 2 offers several notable advantages. The field adjustable head shaft assembly 10 of the first preferred embodiment transfers labor from a machinist who constructs the custom or telescopic tube to a contractor in the field who is able to field fit the center tube 12 and thereafter place the collector sprockets 24a, 24b for nearly any tank 2. It is less expensive to manipulate standardized materials, such as the center tube 12, the positioning of the collector sprockets 24a, 24b and the collars 14a, 14b, on-site, than it is to custom-make or size materials in a machine shop before shipping. The design process is also simplified. Instead of making a separate drawing for the manufacture of each custom-made part for the traditional telescopic or custom head shaft assembly, drawings can be made for a few parts that apply to multiple possible tank widths $W_T$ or bay widths within the tanks 2. Replacing custom-made with standardized parts simplifies inventory and reduces the time from the design stage to the shipping of the preferred head shaft assembly 10 and any additional related components.

In the first preferred embodiment, the drive keys 20a, 20b are integrally formed on the end tubes 16a, 16b, but are not so limited and may be separately formed and mounted to the end tubes 16a, 16b or the end tubes 16a, 16b may be otherwise rotatably coupled to the bull sprocket 22 and the collector sprockets 24a, 24b. The preferred integral drive keys 20a, 20b transfer torque from the bull sprocket 22 to the collector sprockets 24a, 24b, the collars 14a, 14b and the center tube 12. The integral keys 20a, 20b may be integrated via adhesive bonding, attachment screws as shown in FIG. 4, integrally formed with the end tubes 16a, 16b or formed during the winding of the end tubes 20a, 20b, such as by integrally molding or winding the end tubes 20a, 20b with a composite material, such as a fiber reinforced plastic ("FRP") or other polymeric materials or composites. The end tubes 16a, 16b may also be constructed of a corrosion resistant metallic material, such as stainless steel, with integrally formed keys 20a, 20b that transmit torque to and from the end tubes 16a, 16b. The preferred center tube 12 and end tubes 16a, 16b are constructed of FRP material.

Prior art drive keys and keyways or slots in the wastewater, industrial and water industries have numerous limitations. Stainless steel prior art keys have a relatively high material cost. Nylon keys absorb water and expand, which is undesirable. Typically, a slot is pre-designed and machined into the head shaft to fit a removable key, raising machining cost and requiring customization. The integral keys 20a, 20b of the first preferred embodiment addresses these limitations. The preferred integral keys are constructed of pultruded and machined fiberglass, which has a lower raw material cost than stainless steel and unlike Nylon generally preserves its dimensions when submerged. Because of the integral design, the drive and driven side keys 20a, 20b have a relatively long key length $L_K$, particularly when compared to prior art shaft keys, thereby allowing the collector sprockets 24a, 24b to be adjusted to additional positions or a differing distances along the key lengths $L_K$ and, therefore, relative to the bull sprocket 22 and the center tube 12, before the collector sprockets 24a, 24b are tightened down and affixed with a setscrew to the drive and drive side end tubes 16a, 16b, respectively. This adjustability or configurability of positioning of the collector sprockets 24a, 24b along the end tubes 16a, 16b permits mounting of the head shaft assembly 10 in numerous tanks 2 when shipped to each customer. It is less expensive to manufacture the preferred adjustable head shaft assembly 10 than to custom-make systems, each with specific slot placements for a key.

Referring to FIG. 4, the integral keys 20a, 20b preferably do not come into direct contact with a bearing 26 of the preferred head shaft assembly 10. The bearing 26 is preferably constructed of an ultra-high-molecular-weight polyethylene ("UHMW-PE"), but is not so limited and may be constructed of nearly any polymeric material or other bearing configuration that is able to take on the general size and shape of the preferred bearing 26, withstand the normal operating conditions of the bearing 26 and perform the preferred functions of the bearing 26, as is described herein. The UHMW-PE material is preferred for its resistance to the working environment in the tank 2, among other features.

Bearings 26 are preferably positioned within the drive and driven side end tubes 16a, 16b in the assembled configuration and are substantially hollow. The bearings 26 surround drive and driven side spindles 18a, 18b that are fixed to the tank 12 and the bearings 26 are fixed to the inside of the drive and driven side end tubes 16a, 16b, respectively. The bearings 26 are configured to facilitate rotation of the drive and driven side end tubes 16a, 16b around the drive and driven side spindles 18a, 18b, respectively.

In most prior art systems, a protrusion on the key interlocks with a slot that goes through the end tube and bearing. This open slot in the prior art is essentially a passageway, allowing abrasive grit and chemicals found in the wastewater industry to seep inwards around the key and into the region where the bearing contacts the spindle. This could lead to the abrasion of the spindle as the assembly rotates, because grit is trapped between the spindle and the bearing. In the first preferred embodiment, by separating the integral key 20a, 20b from the bearing 26, the grit is generally prevented from seeping inwards into the bearing slot, thereby protecting the bearings 26, end tubes 20a, 20b, collars 14a, 14b, collector sprockets 24a, 24b and the bull sprocket 22 more effectively. The preferred separate bearing 26 also has an increased part life compared to a prior art bearing.

In the first preferred embodiment, the center tube 12 and the end tubes 20a, 20b are constructed of composite materials, such as fiber reinforced polymer or fiber reinforced plastic ("FRP"). The FRP material is preferably biaxially wrapped at a forty-five degree (45°) angle to aid in transmitting torque through the head shaft assembly 10. Prior art tubes are often constructed of one-piece or telescopic steel or stainless steel shafts that tend to corrode, have high material and machining cost, are difficult to install due to the large weight, and require the removal of the spindles during replacement. The FRP center tube 12 and end tubes 16a, 16b of the first preferred embodiment overcomes these limitations, having greater corrosion resistance, a lower machining and material cost, and less weight for ease of installation. The replacement of the center tube 12 does not necessarily require removal of the spindles 18a, 18b and the collector sprockets 24a, 24b, because the collars 14a, 14b can slide inwards, allowing for the center tube 12 to be removed. In addition, the end tubes 16a, 16b and collector sprockets 24a, 24b are able to slide inwards off the spindles 18a, 18b for inspection, repair or replacement. The reverse order is followed for installing a replacement center tube 12 or head shaft assembly 10. A prior art telescopic head shaft requires customized slots with interlock keys to fix the assembly in its extended position and prevent the end tubes from collapsing into the center sleeve. The need for customized slots raises machining cost, increases design time and reduces the structural strength of the head shaft. The equal diameter of the center tube 12 and the end tubes 16a, 16b of the first preferred embodiment generally prevents the end tubes 16a, 16b from sliding inwards, which reduces cost by removing the need for slots and an interlock key used in a telescopic head shaft design.

For a prior art one-piece or telescopic head shaft, split sprocket halves are clamped over the installed assembly. It can be cumbersome to balance, align, and attach the two sprocket halves over the prior art head shaft during installation. During the installation of the preferred head shaft assembly 10, the one-piece drive and driven side collector sprockets 24a, 24b can be slipped over and positioned on the end tubes 16a, 16b before the drive end 12a and driven end 12b are joined together with the end tubes 16a, 16b by the collars 14a, 14b. This assembly technique is an advantage, because the preferred one-piece collector sprockets 24a, 24b are easier to install, and removing the need to split the sprocket reduces manufacturing and hardware cost, as well as potential errors when assembling the split sprockets.

The preferred collars 14a, 14b are comprised of outer sleeves that joins the center tube 12 to the end tubes 16a, 16b, specifically, joining the drive end 12a of the center tube 12 to the drive side end tube 16a with the drive side collar 14a and joining the driven end 12b of the center tube 12 to the driven side end tube 16b with the driven side collar 14b. The collars 14a, 14b are preferably constructed of a biaxially wrapped FRP, but are not so limited and may be constructed of any material that is able to take on the general size and shape of the collars 14a, 14b, withstand the normal operating conditions of the collars 14a, 14b and perform the preferred functions of the collars 14a, 14b. The collars 14a, 14b are preferably secured to the center and end tubes 12, 16a, 16b with two perpendicular through bolts 28 on either side of a seam or butting ends of the center tube 12 with the end tubes 16a, 16b, respectively. The bolts 28 are preferably encased with polyvinyl chloride ("PVC") sleeves 44 as spacers to limit inward collapsing of the tubes 12, 16a, 16b during tightening of the bolts 28 and to limit the potentially sharp threads of the bolts 28 from contacting the surrounding FRP of the collars 14a, 14b and tubes 12, 16a, 16b. The collars 14a, 14b also preferably provide structural support by overlapping the seam and transmitting torque between the center tube 12 and the end tubes 16a, 16b. The drive and driven side collars 14a, 14b are fixed to the drive and driven side end tubes 16a, 16b, respectively, and the center tube 12 by the plurality of bolts 28. At least one of the plurality of bolts 28, preferably an outermost bolt 28 on both the drive and driven side in the assembled configuration fix the bearing 26 to the drive and driven side collars 14a, 14b and the drive and driven side end tubes 16a, 16b, respectively. In the first preferred embodiment, the drive side collar 14a is fixed to the center tube 12 and the drive side end tube 16a by four (4) through bolts 28 and the driven side collar 14b is fixed to the center tube 12 and the driven side end tube 16b by four (4) through bolts 28.

As shown in FIG. 4, the outermost bolt 28 on both the drive and driven side passes through the bearing 26 inside the end tubes 16a, 16b, which turns with the end tubes 16a, 16b on the drive and driven side spindles 18a, 18b. This end through bolt 28 fixes the position of the bearing 26 inside the end tubes 16a, 16b, thereby driving the bearing 26 to turn on the spindles 18a, 18b while maintaining proper installation requirements. During the installation process, the pre-drilled collars 14a 14b function as a drilling jig for drilling properly positioned through holes for the collar bolts 28. The collars 14a, 14b also act as stops to prevent the collector sprockets 24a, 24b from being placed too far inward on the integrally keyed end tubes 16a, 16b.

Figure 5:
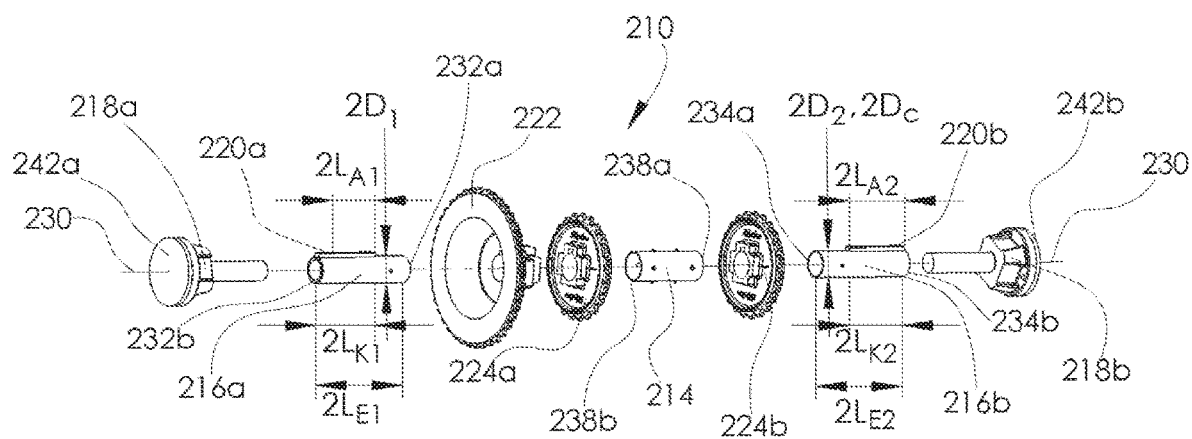
FIG. 5 is a front perspective, partially exploded view of a head shaft assembly in accordance with a second preferred embodiment of the present invention.

Referring to FIG. 5, a second preferred embodiment of the head shaft assembly 210 has similarities to the first preferred embodiment of the head shaft assembly 10 and like reference numerals are utilized to identify like features, with a "2" prefix utilized to distinguish the second preferred embodiment of the head shaft assembly 210 from the first preferred head shaft assembly 10, as well as components of the chain-and-flight sludge collection system. The head shaft assembly 210 of the second preferred embodiment is preferably used for mounting in the municipal, aquaculture or industrial water or wastewater tank 2 having the tank width $W_T$.

The second preferred head shaft assembly 210 does not include the three (3) tubes of the first preferred head shaft assembly 10, but includes an assembly with only two (2) tubes. The second preferred head shaft assembly 210 includes the drive and driven side end tubes 216a, 216b without the center tube, although either of the end tubes 216a, 216b may be considered the center tube in the second preferred embodiment. For example, the driven side end tube 216b may be considered the center tube, in that the driven side end tube 216b includes the drive or inner end 234a and the driven or outer end 234b and the driven side end tube diameter $2D_2$ or the center diameter $2D_C$ that is the same or substantially the same as the first or drive side end tube diameter $2D_1$. In an assembled configuration, the inner end 232a of the drive side end tube 216a and the drive or inner end 234a of the driven side end tube 216b, which may be considered substantially the same or similar to the above-described center tube 12 of the first preferred embodiment, are positioned within the hollow of the drive side collar 214 between the first end 238a and the second end 238b of the collar 214. The collar 214 fixes the drive side end tube 216a to the center or driven side end tube 216b in the assembled configuration to transmit torque from the bull sprocket 222 to the driven side collector sprocket 224b. The second preferred head shaft assembly 210 also includes the drive side collector sprocket 224a, the longitudinal axis 230, the drive and driven side spindles 218a, 218b and the drive and driven side mounting grouts 242a, 242b. the second preferred head shaft assembly 210 may further include bearings (not shown), similar to the drive and driven side bearings 26 of the first preferred embodiment.

The second preferred head shaft assembly 210 includes the drive and driven side end tubes 216a, 216b having the drive and driven side integral keys 220a, 220b extending longitudinally along their respective outer surfaces, the inner ends 232a, 234a and the outer end 232b, 234b, respectively. The keys 220a, 220b have drive and driven side key lengths $2L_{K1}$, $2L_{K2}$ drive and driven side available lengths $2L_{A1}$, $2L_{A2}$ and drive and driven side end tube lengths $2L_{E1}$, $2L_{E2}$. The second preferred head shaft assembly 210 may be installed within a tank 2 that has a relatively small tank width $W_T$ or may be configured with one or several of the collar 214, the drive side end tube 216a and the driven side end tube 216b having a relatively large length or drive or driven side end tube length $2L_{E1}$, $2L_{E2}$ that are configured to cut to length such that the assembled second preferred head shaft assembly 210 fits or may be installed into the tank 2. For example, the collar 214 may be delivered having a relatively significant length that is cut to accommodate the tank width $W_T$ when the second preferred head shaft assembly 210 is installed in the tank 2 with relatively short end tubes 216a, 216b. Alternatively, one of the drive or driven side end tubes 216a, 216b may be delivered with a relatively long or significant drive or driven side end tube length $2L_{E1}$, $2L_{E2}$ that may be cut to size when installed in the tank 2. In any of these configurations of the second preferred head shaft assemblies 210, the driven end or inner end 232a of the drive side end tube 216a and the inner or drive side end 234a of the driven side end tube 216a, which may be considered the center tube, are positioned within the hollow of the collar 214 with the drive side end tube diameter $2D_1$ and the center tube diameter or driven side end tube diameter $2D_2$ within the collar 214 being the same or substantially the same. The second preferred embodiment may be particularly advantageous for relatively narrow or small tanks 2 with relatively short tank widths $W_T$ where the length of the center tube 12 is of limited value. The second preferred head shaft assembly 210, however, may be utilized and adapted for nearly any sized and shaped tank 2 by lengthening any of the drive and driven side end tubes 216a, 216b and/or the collar 214.

The second preferred head shaft assembly 210, with the exception of not including the separate center tube 12 of the first preferred embodiment and the two separate collars 14a, 14b of the first preferred embodiment is constructed, installed and operates substantially the same as the first preferred embodiment of the head shaft assembly 10 and the materials, dimensions, constructions, operation and assembly details of the first preferred head shaft assembly 10 described above are equally applicable to the features and components of the second preferred head shaft assembly 210.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A head shaft assembly for mounting in a water, wastewater or industrial tank having a tank width, the head shaft assembly comprising:
   a center tube having a drive end and a driven end, the center tube having a center tube diameter;
   an end tube having a key extending longitudinally along an outer surface, an inner end and an outer end, the key defining a key length, the end tube having an end tube diameter;
   a collector sprocket mountable to the end tube and rotationally secured to the end tube by the key in an assembled configuration; and
   a collar being hollow between a first end and a second end, the center tube diameter being substantially the same as the end tube diameter, the inner end and the drive end or the driven end positioned within the hollow of the collar between the first end and the second end in an assembled configuration, the collar rotatably fixing the center tube to the end tube in the assembled configuration.

2. The head shaft assembly of claim 1, wherein the center tube and the end tube are constructed of a composite material.

3. The head shaft assembly of claim 1, further comprising:
   a bull sprocket mountable to the end tube and rotationally secured to the end tube by the key in an assembled configuration, the end tube comprised of a drive side end tube, the drive end positioned within the hollow of the collar.

4. The head shaft assembly of claim 1, further comprising:
   a bearing positioned within the end tube in the assembled configuration, the bearing being substantially hollow; and
   a spindle fixed to the tank, the bearing positioned around the spindle and fixed to the end tube, the bearing configured to facilitate rotation of the end tube around the spindle.

5. The head shaft assembly of claim 4, wherein the bearing is constructed of an ultra-high-molecular-weight polyethylene.

6. The head shaft assembly of claim 1, wherein the collar is fixed to the end tube and the center tube by a plurality of bolts, at least one of the plurality of bolts fixing a bearing to the collar and the end tube.

7. The head shaft assembly of claim 1, wherein the collar includes a drive side collar and a driven side collar and the end tube includes a drive side end tube and a driven side end tube.

8. The head shaft assembly of claim 7, wherein the drive side collar fixes the drive end to the drive side end tube and the driven side collar fixes the driven end to the driven side end tube.

9. The head shaft assembly of claim 1, wherein the key is integrally formed on the end tube.

10. The head shaft assembly of claim 1, wherein the key is fastened to the end tube by a plurality of key fasteners.

11. The head shaft assembly of claim 1, wherein the key is fastened to the end tube by adhesive bonding.

12. The head shaft assembly of claim 1, wherein the center tube has a center tube length measured between the drive end and the driven end, the center tube length configured to be adjusted by cutting the center tube to adapt the head shaft assembly for the tank.

13. The head shaft assembly of claim 1, wherein the collar is fixed to the center tube and the end tube by four through bolts.

14. The head shaft assembly of claim 1, wherein the end tube has an end tube length, the end tube length being greater than the key length.

15. The head shaft assembly of claim 1, wherein the key extends from the outer end toward the inner end.

16. A head shaft assembly for mounting in a water, wastewater or industrial tank having a tank width, the head shaft assembly comprising:
   a center tube having a drive end and a driven end, the center tube having a center tube diameter;
   a drive side end tube having a drive side key extending longitudinally along an outer surface, an inner drive side end and an outer drive side end, the drive side end tube having a drive side end tube diameter;
   a driven side end tube having a driven side key extending longitudinally along an outer surface, an inner driven side end and an outer driven side end, the driven side end tube having a driven side end tube diameter;
   a drive side collector sprocket mountable to the drive side end tube and rotationally secured to the drive side end tube in an assembled configuration;
   a driven side collector sprocket mountable to the driven side end tube and rotationally secured to the driven side end tube in the assembled configuration;
   a drive side collar being hollow between a first drive end and a second drive end; and
   a driven side collar being hollow between a first driven end and a second driven end, the center tube diameter being substantially the same as the drive side end tube diameter and the driven side end tube diameter, the drive end positioned proximate the inner drive side end and the driven end positioned proximate the inner driven side end in the assembled configuration, the drive end and the inner end positioned within the drive side collar between the first drive end and the second drive end in the assembled configuration, the drive side collar rotatably fixing the center tube to the drive side end tube in the assembled configuration.

17. The head shaft assembly of claim 16, wherein the drive side end tube has a drive side key and the driven side end tube has a driven side key, the drive side key and the driven side key having a key length and the drive and driven side end tubes having an end tube length, the end tube length being greater than the key length.

18. The head shaft assembly of claim 17, wherein the drive side collector sprocket is rotationally secured to the drive side end tube by the drive side key and the driven side collector sprocket is rotationally secured to the driven side end tube by the driven side key.

19. The head shaft assembly of claim 16, further comprising:
   a drive side bearing mounted within and fixed to the drive side end tube; and
   a drive side spindle mounted to the tank, the drive side bearing configured to facilitate rotation of the drive side bearing and drive side end tube around the drive side spindle.

20. The head shaft assembly of claim 19, wherein the drive side bearing is fixed to the drive side end tube by a through bolt.

21. The head shaft assembly of claim 16, wherein the drive side collar is fixed to the center tube and the drive side end tube by a plurality of bolts.

\* \* \* \* \*